(12) United States Patent
Brown et al.

(10) Patent No.: US 7,552,202 B2
(45) Date of Patent: Jun. 23, 2009

(54) SYSTEM AND METHOD TO UNIQUELY IDENTIFY IDENTICALLY CONFIGURED BRANCHES IN A DISTRIBUTED ENTERPRISE

(75) Inventors: Michael Wilfrid Brown, Austin, TX (US); Brian Keith Howe, Round Rock, TX (US); Radhakrishnan Sethuraman, Austin, TX (US); Manuel Silveyra, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 11/077,286

(22) Filed: Mar. 10, 2005

(65) Prior Publication Data
US 2006/0206594 A1  Sep. 14, 2006

(51) Int. Cl.
*G06F 15/177* (2006.01)
(52) U.S. Cl. ............... 709/220; 709/221; 709/222; 709/239
(58) Field of Classification Search ......... 709/220–222, 709/239; 717/177
See application file for complete search history.

(56) References Cited

U.S. PATENT DOCUMENTS

| | | | |
|---|---|---|---|
| 5,394,556 A | 2/1995 | Oprescu | 395/800 |
| 5,787,246 A | 7/1998 | Lichtman et al. | 395/200.5 |
| 5,805,805 A | 9/1998 | Civanlar et al. | 395/200.5 |
| 6,122,664 A | 9/2000 | Boukobza et al. | 709/224 |
| 6,286,038 B1 * | 9/2001 | Reichmeyer et al. | 709/220 |
| 6,295,556 B1 | 9/2001 | Falcon et al. | 709/220 |
| 6,711,617 B1 * | 3/2004 | Bantz et al. | 709/227 |
| 6,775,278 B1 | 8/2004 | Britton et al. | 370/389 |
| 7,013,331 B2 * | 3/2006 | Das | 709/220 |
| 7,035,257 B2 * | 4/2006 | Vafaei | 370/389 |
| 7,188,191 B1 * | 3/2007 | Hovell et al. | 709/245 |
| 7,206,828 B1 * | 4/2007 | Bourke-Dunphy et al. | 709/221 |
| 7,330,470 B2 * | 2/2008 | Nakazawa et al. | 370/392 |

(Continued)

OTHER PUBLICATIONS

"IPv6 Stateless DNS Discovery <draft-ietf-ipngwg-dns-discovery-03.txt>" Thater,D. Hagino, J. Nov. 19, 2001 Network Working Group of Internet Engineering Task Force (IETF), Draft version 03, http://ietfreport.isoc.org/all-ids/draft-ietf-ipngwg-dns-discovery-03.txt.*

(Continued)

*Primary Examiner*—Jeffrey Pwu
*Assistant Examiner*—David Ampagoomian
(74) *Attorney, Agent, or Firm*—Stephen R. Tkacs; Stephen J. Walder, Jr.; Herman Rodriguez

(57) ABSTRACT

A system and method to uniquely identify identically configured branches in a distributed enterprise such that branch specific configuration information may be used to configure computing devices in the identified branch are provided. With the system and method, upon being deployed in a branch location, the computing device sends a communication to a centralized configuration server using an address provided in default initial configuration information. The communication is sent from the computing device to a branch router which adds its address to the communication. The branch router address is then used by the centralized configuration server to identify the branch and thus, configuration information for computing devices of the branch. The configuration information may then be provided to the computing device for configuration of the computing device for branch-specific operation.

9 Claims, 3 Drawing Sheets

U.S. PATENT DOCUMENTS

| | | | |
|---|---|---|---|
| 2002/0161867 A1* | 10/2002 | Cochran et al. | 709/221 |
| 2003/0101250 A1 | 5/2003 | Sweitzer et al. | 709/223 |
| 2003/0126021 A1* | 7/2003 | Mizushima et al. | 705/22 |
| 2005/0091349 A1* | 4/2005 | Scheibli | 709/222 |
| 2005/0286514 A1* | 12/2005 | Cheshire | 370/389 |
| 2006/0047792 A1* | 3/2006 | Dharmarajan et al. | 709/220 |

OTHER PUBLICATIONS

"RFC3022, Traditional IP Network Address Translator (Traditional NAT)" Srisuresh, P. Egevang, K. Jan. 2001 Network Working Group of Internet Engineering Task Force (IETF), http://tools.ietf.org/html/rfc3022.*

* cited by examiner

SYSTEM AND METHOD TO UNIQUELY IDENTIFY IDENTICALLY CONFIGURED BRANCHES IN A DISTRIBUTED ENTERPRISE

BACKGROUND OF THE INVENTION

1. Technical Field

The present invention relates generally to an improved data processing system and method. In particular, the present invention provides a system and method to uniquely identify identically configured branches in a distributed enterprise.

2. Description of Related Art

In a distributed enterprise, such as a retail or banking enterprise, the enterprise's computer network may consist of many branches that may be configured identically, i.e. network topology, shared drives, network attached storage devices, etc. For example, in a retail enterprise, each branch, i.e. store, may have a similar configuration for its network, i.e. a server, network data storage device, computing devices in the sporting goods, electronics, clothing, etc., departments, and the like. Thus, from one standpoint, each branch looks to be the same. This can be a problem when attempting to configure computing devices for a specific branch with branch specific information.

Since each branch looks to be exactly the same from a centralized viewpoint, it is not possible to remotely configure each branch individually with their own branch-specific configuration information. That is, it is not possible to differentiate between branches so that one can determine which configuration information is to be applied to which branch computing device. As a result, with known systems, it is necessary to send a human technician to the physical branch location in order to configure the computing devices at that branch location with branch specific configuration information.

In view of the above, it would be beneficial to have a system and method to uniquely identify identically configured branches in a distributed enterprise so that branch specific configuration information may be used to configure computing devices in the identified branch.

SUMMARY OF THE INVENTION

In one illustrative embodiment, a method is provided in a data processing system for configuring a computing device for use with a specific branch of a distributed enterprise. The method comprises receiving, at a configuration server, an initialization message from the computing device. The initialization message received from the computing device is redirected from a first destination identified in header information of the initialization message to another destination determined by a router associated with the specific branch. The computing device is pre-installed with default configuration information at a central location. The first destination is identified in the configuration information by a dummy address. The method further comprises extracting, at the configuration server, an external router address from the initialization message. The external router address is associated with the specific branch. The external router address is appended to the initialization message by the router associated with the specific branch in response to receiving the initialization message from the computing device. The router receives the initialization message from the computing device, extracts a destination identifier from the initialization message, determines that the destination address is the dummy address, recognizes the dummy address as a configuration address, and redirects the initialization message to the configuration server responsive to the destination address being the dummy address. The method further comprises performing a lookup of the external router address in one of a Dynamic Host Configuration Protocol (DHCP) server, a Lightweight Directory Access Protocol (LDAP) server, or a database server, identifying a corresponding branch identifier. The method further comprises performing a lookup of the branch identifier in a configuration table identifying branch-specific configuration information for the computing device based on the external router address. The method further comprises sending the branch-specific configuration information from the configuration server to the computing device to thereby configure the computing device. The computing device self-configures using the configuration information for specialized use in the specific branch.

In another illustrative embodiment, a computer program product in a computer recordable medium is provided for configuring a computing device for use with a specific branch of a distributed enterprise. The computer program product comprises instructions for receiving, at a configuration server, an initialization message from the computing device. The initialization message received from the computing device is redirected from a first destination identified in header information of the initialization message to another destination determined by a router associated with the specific branch. The computing device is pre-installed with default configuration information at a central location. The first destination is identified in the configuration information by a dummy address. The computer program product further comprises instructions for extracting, at the configuration server, an external router address from the initialization message. The external router address is associated with the specific branch. The external router address is appended to the initialization message by the router associated with the specific branch in response to receiving the initialization message from the computing device. The router receives the initialization message from the computing device, extracts a destination identifier from the initialization message, determines that the destination address is the dummy address, recognizes the dummy address as a configuration address, and redirects the initialization message to the configuration server responsive to the destination address being the dummy address. The computer program product further comprises instructions for performing a lookup of the external router address in one of a Dynamic Host Configuration Protocol (DHCP) server, a Lightweight Directory Access Protocol (LDAP) server, or a database server, identifying a corresponding branch identifier. The computer program product further comprises instructions for performing a lookup of the branch identifier in a configuration table identifying branch-specific configuration information for the computing device based on the external router address and instructions for sending the branch-specific configuration information from the configuration server to the computing device to thereby configure the computing device. The computing device self-configures using the configuration information for specialized use in the specific branch.

In yet another illustrative embodiment, a system for configuring a computing device for use with a specific branch of a distributed enterprise comprises a computing device located in the specific branch of the distributed enterprise, a router associated with the specific branch, a database server, and a configuration computing device coupled to the router via one or more data networks. The computing device is pre-installed with default configuration information at a central location and wherein the first destination is identified in the configuration information by a dummy address. The router is configured to receive an initialization message from the computing device, append an external router address in response to receiving the initialization message from the computing device, extract a destination identifier from the initialization message, determine that the destination address is the dummy address, recognize the dummy address as a configuration address, and redirect the initialization message to the configuration server responsive to the destination address being the dummy address. The configuration computing device is configured to receive the initialization message from the computing device via the router. The initialization message received from the computing device is redirected from a first destination identified in header information of the initialization message to another destination determined by the router. The configuration computing device is further configured to extract the external router address from the initialization message, perform a lookup of the external router address in the database server identifying a corresponding branch identifier, perform a lookup of the branch identifier in a configuration table identifying branch-specific configuration information for the computing device based on the external router address, and send the branch-specific configuration information to the computing device to thereby configure the computing device. The computing device self-configures using the configuration information for specialized use in the specific branch.

These and other features of the illustrative embodiments will be described in, or will become apparent to those of ordinary skill in the art in view of, the following detailed description of the example embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As mentioned above, the present invention is directed to a system and method to uniquely identify identically configured branches in a distributed enterprise. The present invention may be implemented in a distributed data processing system to aid in the configuration of remotely located computing devices at one or more branch locations of a distributed enterprise. The mechanisms of the present invention may be used to aid in the configuration of any type of computing device at a branch location of a distributed enterprise including servers, client devices, printer devices, remote storage devices, and the like. For purposes of the present description, it will be assumed that the computing device is a server computing device, although the present invention is not limited to such.

The present description makes reference to "branches" of a "distributed enterprise." In the context of the present description, a "distributed enterprise" is a business or governmental organization having more than one location at which it conducts business. These locations, referred to herein as "branches," may be remotely located from one another. These branches have associated computing systems, such as intranets or other enterprise computing systems, which may be connected to one another via a computing network, such as the Internet.

Figure 1:
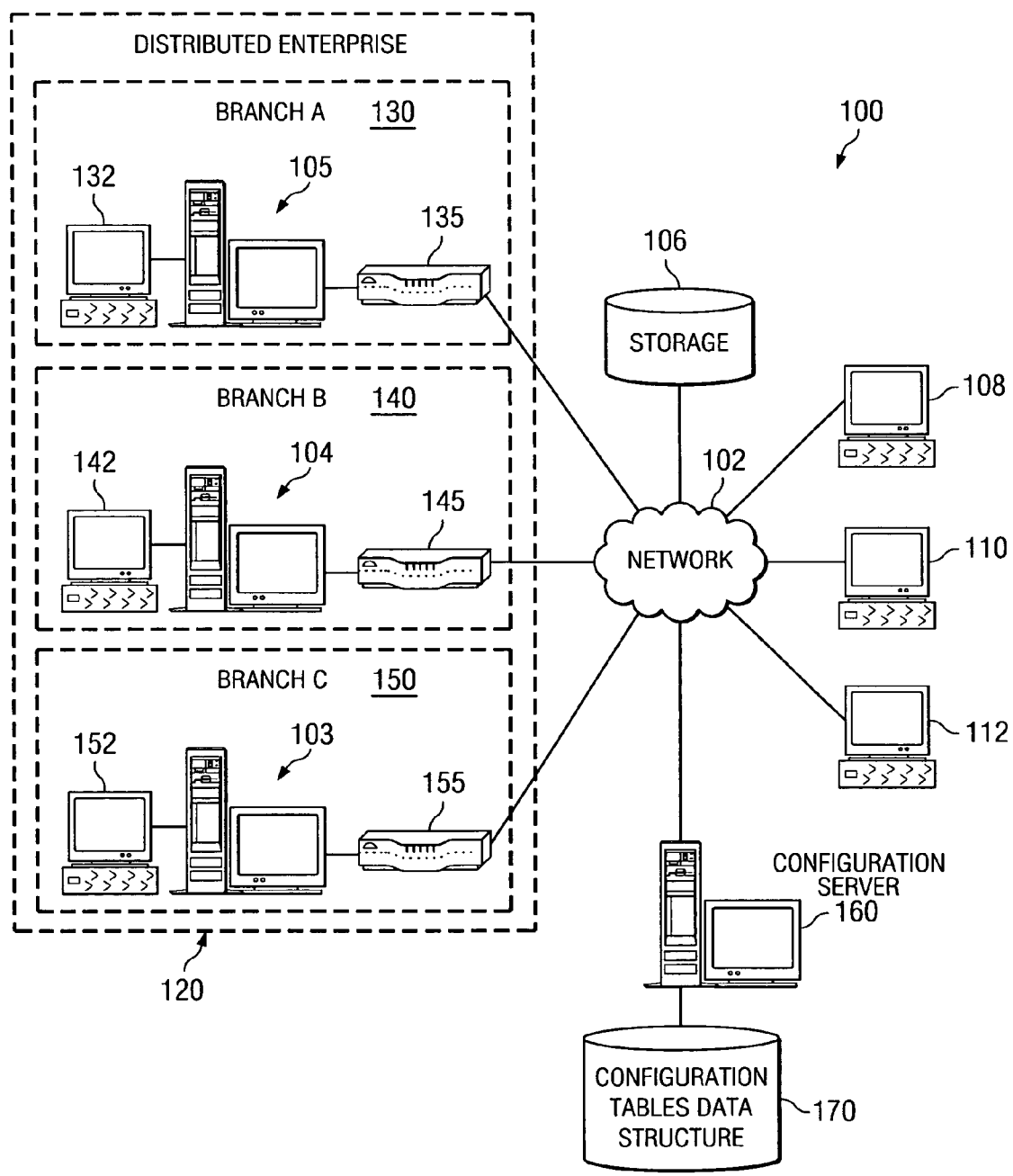
FIG. 1 is an exemplary diagram of a distributed data processing system in which exemplary aspects of the present invention may be implemented.

With reference now to the figures, FIG. 1 is an exemplary diagram of a distributed data processing system in which exemplary aspects of the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include connections, such as wired communication links, wireless communication links, or fiber optic cables.

In the depicted example, servers 103, 104, and 105 are connected to network 102 via branch routers 135, 145 and 155. In addition, storage unit 106 and client computing devices 108, 110, and 112 are connected to the network 102. The client computing devices 108, 110, and 112 may be, for example, personal computers or network computers. In the depicted example, servers 103, 104, and 105 provide data, such as boot files, operating system images, and applications to client computing devices 108-112 and/or other computing devices, e.g., client computing devices 132, 142 and 152 present within each branch 130, 140, and 150 of the distributed enterprise 120. Client computing devices 108, 110, 112, 132, 142 and 152 are clients to servers 103, 104, and 105. Distributed data processing system 100 may include additional servers, clients, and other devices not shown.

In the depicted example, network 102 represents the Internet, i.e. a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, Distributed data processing system 100 may also be implemented with other types of networks in addition to, or in replacement of, the Internet illustrated in FIG. 1, such as for example, intranets, local area networks (LANs), or wide area networks (WANs). FIG. 1 is intended as an example, and not as an architectural limitation for the present invention.

Figure 2:
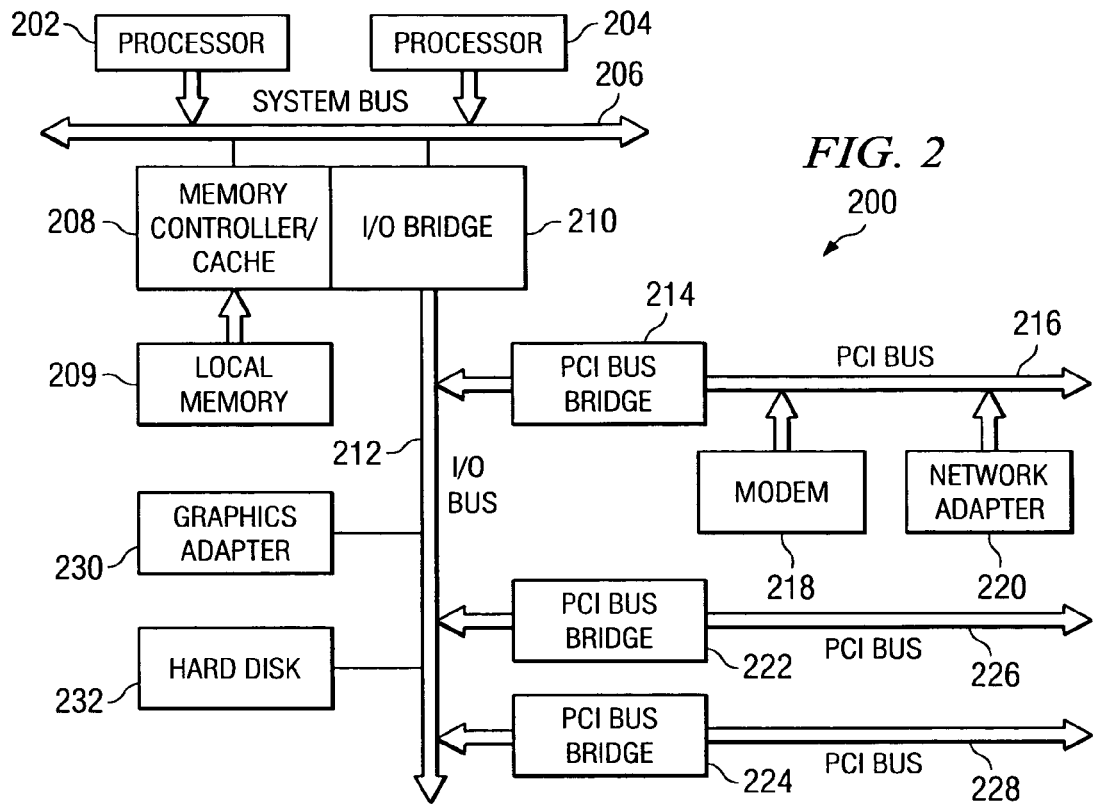
FIG. 2 is an exemplary diagram illustrating a server data processing device in which aspects of the present invention may be implemented.
Figure 3:
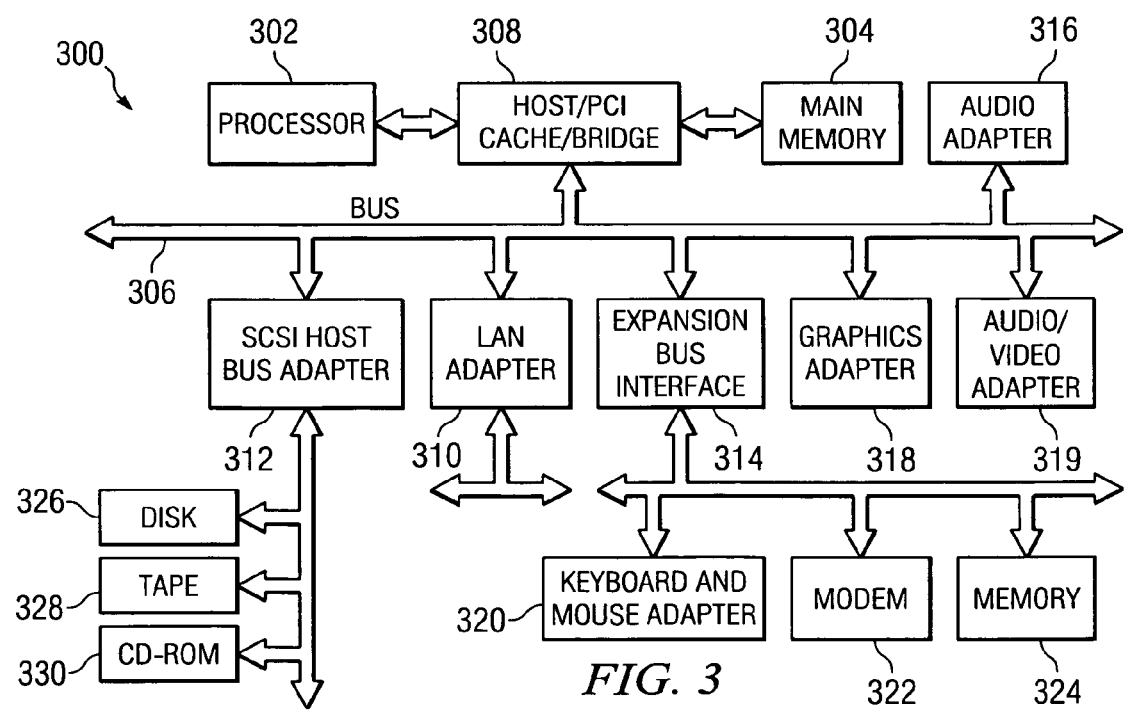
FIG. 3 is an exemplary diagram illustrating a client data processing device in which aspects of the present invention may be implemented.

The present invention provides mechanisms for uniquely identifying identically configured branches 130, 140 and 150, of a distributed enterprise 120. This unique identification is used as a basis for providing a mechanism to configure computing devices in a branch specific manner. The present invention may be used to configure any type of computing device including server computing devices, client computing devices, storage devices, printers, and the like. In addition, the mechanisms of the present invention make use of computing devices, such as server computing devices, to perform the configuring of remotely located computing devices in branches 130, 140 and 150 of a distributed enterprise 120. FIGS. 2 and 3 are provided as examples of server computing devices and client computing devices in which aspects of the present invention may be implemented.

Referring to FIG. 2, a block diagram of a data processing system that may be implemented as a server, such as server 103, 104, and/or 105 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to client computing devices 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computing device. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As discussed above, the present invention provides a system and method to uniquely identify identically configured branches in a distributed enterprise such that branch specific configuration information may be used to configure computing devices in the identified branch. Referring again to FIG. 1, with the system and method of the present invention, computing devices, such as servers 103, 104 and 105 that are to be deployed in branch locations are pre-installed with default initial configuration information at a central location. As part of this default initial configuration information, an address of a centralized configuration server 160 is provided. The same centralized configuration server 160 may be used for all computing devices that are to be remotely configured in the distributed enterprise 120. Alternatively, for largely distributed enterprises, this address may be an address for a configuration server 160 for a particular geographical region, such that a small set of address may be used depending upon which region the servers 103, 104 and 105 are destined to be installed. Moreover, if the same centralized configuration server 160 address is used for all computing devices to be installed in the distributed enterprise, the branch routers 135, 145, and 155 may redirect communications using the centralized configuration server 160 address to another address for a regional configuration server.

In yet another alternative embodiment, the address provided as part of the default initial configuration information may be a "dummy" address that is recognized by branch routers 135, 145 and 155 as being a configuration address. The branch routers 135, 145, and 155 may redirect communications using this dummy address to a pre-established configuration server address. Thus, either the address provided as part of the default initial configuration information of the server 103, 104, and 105 is utilized to communicate with the configuration server 160, or the address is used as a basis for redirection of the communication to another configuration server.

Upon being deployed in a branch location 130, 140, and 150, the servers 103, 104 and 105, are booted and initialized. As part of this initialization process, the servers 103, 104 and 105 send a communication directed to the centralized configuration server 160 using the address provided in the default initial configuration information. This communication is a request for configuration information such that the servers 103, 104, and 105 may self-configure themselves.

The communications are sent from the servers 103, 104 and 105 to respective branch routers 135, 145, and 155. The branch routers 135, 145, and 155 either pass the communications through and append their own external router address to the headers of the data packets in the communications, or redirect the communications to a different centralized configuration server, depending on the particular implementation of the present invention, with the appended external router address of the branch routers 135, 145, and 155 in the data packet headers.

At the centralized configuration server, the communications from the servers 103, 104, and 105 at the branch locations 130, 140, and 150 are received and the external router addresses for branch routers 135, 145, and 155 are extracted from the data packet headers. The branch router addresses are then used to lookup which configuration information is to be provided to the servers 103, 104 and 105. This lookup may be done directly based on the external router addresses or the external router addresses may be used as a basis for determining branch identification information which is used to identify configuration information for the servers 103, 104, and 105. In embodiments in which the external router addresses are used to lookup branch identification information, a lookup table may be provided remotely or local to the configuration server 160. In some embodiments, a Dynamic Host Configuration Protocol (DHCP) server may be used to lookup the external router address and its corresponding branch identifier. The DHCP server embodiment is especially useful when external router addresses may be assigned dynamically.

In one exemplary embodiment, the external router addresses, or alternatively the branch identification information, are used to lookup configuration file information for the corresponding servers 103, 104, and 105. The lookup of the configuration file information may be performed using the local configuration tables data structure 170 or alternatively, a remotely located configuration tables data structure, such as may be provided in storage device 106. The configuration tables data structure 170 provides a correspondence between either the external router address or the branch identifier, and one or more configuration files for configuring new computing devices in the corresponding branch location 130, 140, and 150.

The configuration files corresponding to the external router address or branch identifier may then be returned to the servers 103, 104, and 105 of branches 130, 140, and 150. The configuration files may be provided using the external router address and server address obtained from the data packet headers of the communication from the servers 103, 104, and 105. This configuration information may then be used by the servers 103, 104, and 105 to configure themselves for specialized use in the identified branches 130, 140 and 150.

The configuration files provided by the configuration server 160 may be any type of configuration data or information that may be used by the servers 103, 104, and 105 to configure themselves for specialized use in their respective branches 130, 140, and 150. Examples of these configuration files and information include information identifying printers or other peripheral devices present in the branch, remote storage devices in the branch, user names associated with the branch, application permissions, security settings information, and the like. In this way, different configuration images may be provided to different branches of the distributed enterprise. Of course, any type of configuration files and configuration information may be used without departing from the spirit and scope of the present invention.

Thus, using the mechanisms of the present invention, a distributed enterprise may make use of default or commonly configured computing devices for deploying into various branches of the distributed enterprise. These default or commonly configured computing devices may then be self-configured automatically upon initialization for specialized use in the particular branch in which they are deployed based on configuration files obtained from a configuration server. The configuration files that are used for this self-configuration are identified based on an external router address associated with a branch router of the branch location.

Figure 4:
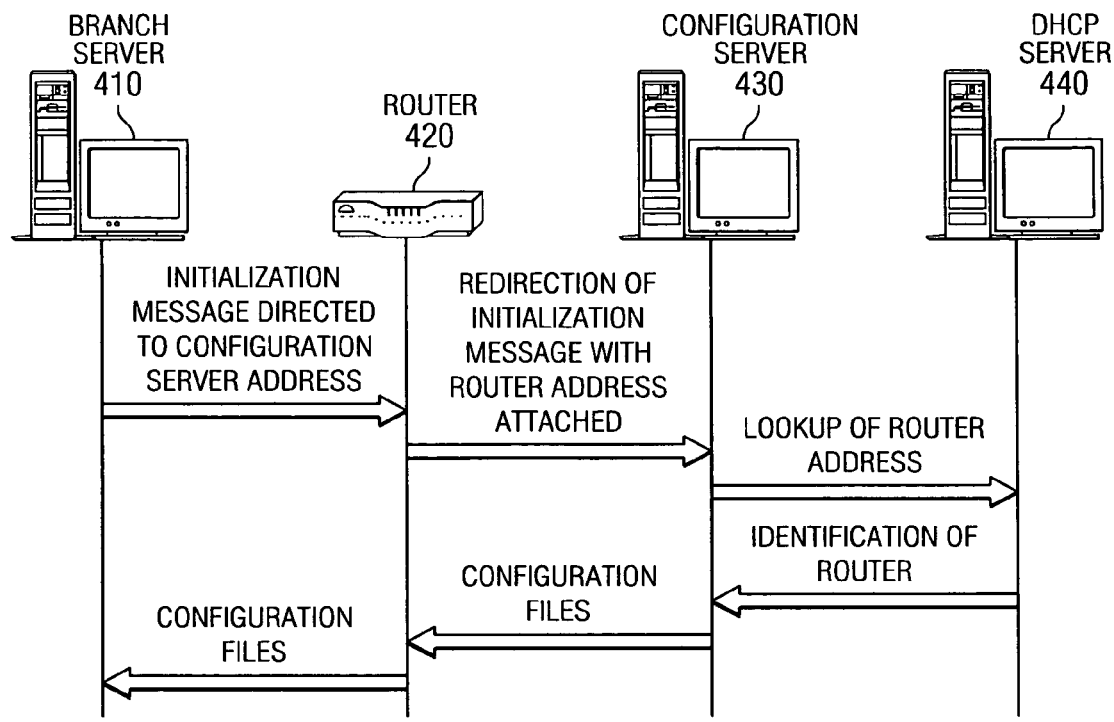
FIG. 4 is an exemplary diagram illustrating the interaction between primary operational elements of one exemplary embodiment of the present invention.

FIG. 4 is an exemplary diagram illustrating the interaction between primary operational elements of one exemplary embodiment of the present invention. The particular embodiment depicted in FIG. 4 makes use of a DHCP server 440 to perform a lookup of an external router address to identify branch identification information. As mentioned above, rather than using a DHCP server 440, the configuration server 430 may make a direct lookup of the external router address in a locally or remotely located configuration table data structure to identify configuration information. However, in some embodiments, such as, for example, where the branch routers may have dynamically assigned addresses, it may be beneficial to make use of a DHCP server 440. Similarly, a lookup of the router address may be performed using a lookup table stored in a Lightweight Directory Access Protocol (LDAP) server or other database server instead of a DHCP server.

As shown in FIG. 4, a branch server 410 is deployed in a branch location with default initial configuration information that includes an address to which a communication is to be sent requesting configuration information (this address may or may not be the actual address to which the communication is later directed by the router 420, depending upon the particular embodiment of the present invention). The branch server 410 sends an initialization message, directed to the address provided in the default initial configuration information, to the branch router 420.

The branch router 420 either passes the initialization message through to the configuration server 430 with its external router address appended to the header information or redirects the initialization message to the configuration server 430, as depicted, with the external router address appended to the header information. In either case, the configuration server 430 receives the initialization message and sends a request message to the DHCP server 440 to perform a lookup of the external router address in the DHCP server 440.

The DHCP server 440 performs a lookup of the external router address in the DHCP server's lookup tables to identify the router from which the initialization message was sent. This identification may be an identification of a branch location from which the initialization message was sent. This identification information may then be provided back to the configuration server 430.

Based on the identification of the router/branch, the configuration server 430 performs a lookup in either local or remotely located configuration tables to identify the configuration files and information that are to be provided to the branch server 410 for self-configuration. The configuration files and information identified by this lookup may then be sent to the branch server 410 via the router 420 using the external router address and branch server 410 address that were provided in the header information of the initialization message sent by the branch server 410. As a result, the branch server 410 may then self-configure itself for specialized use in the branch location at which it is deployed using the configuration files and information provided by the configuration server 430.

As mentioned above, it should be appreciated that while the exemplary embodiments are directed to the configuration of branch servers, the present invention is not limited to such. Rather, any computing device that may be self-configured using configuration files and information obtained from a remote location may be used with the mechanisms of the present invention. For example, client computing devices at the branch locations may likewise be configured using the mechanisms of the present invention.

Figure 5:
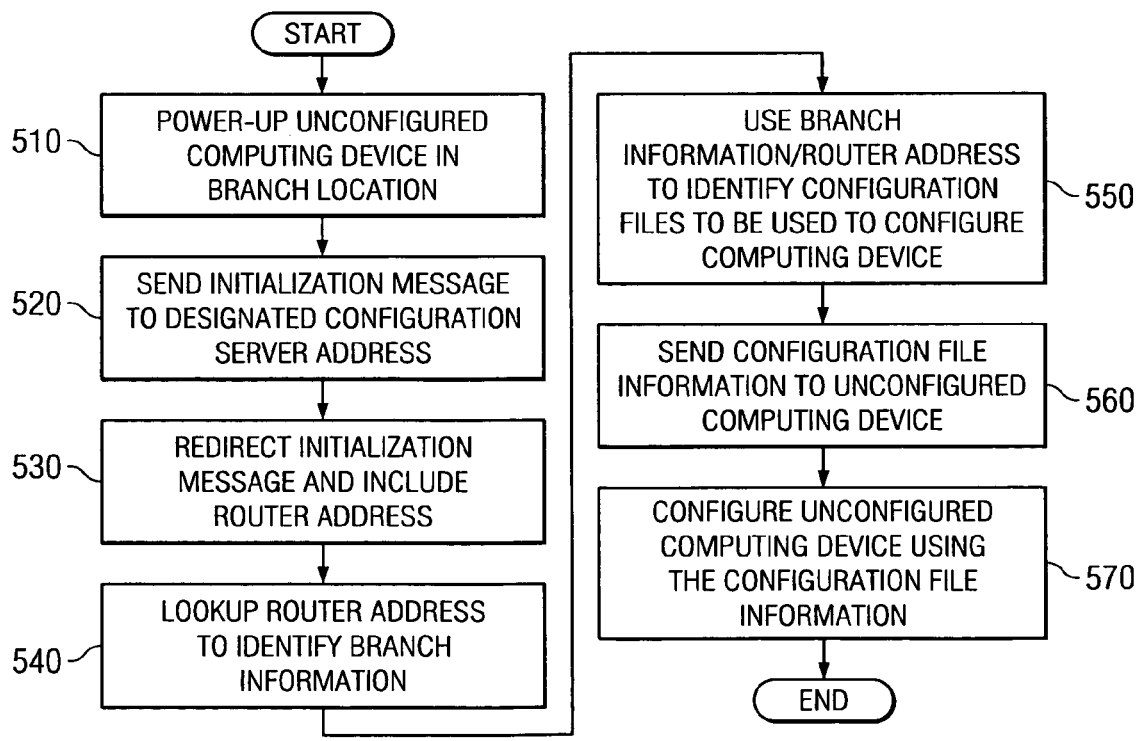
FIG. 5 is a flowchart outlining an exemplary operation of one exemplary embodiment of the present invention.

FIG. 5 is a flowchart outlining an exemplary operation of one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 5, the operation starts by powering-up a default configured computing device, herein referred to as an "unconfigured" computing device since it has not been configured for the specific branch in which it is deployed (step 510). An initialization message destined for a designated configuration server address is sent by the unconfigured computing device (step 520). The initialization message is then redirected by a branch router and the branch router's external router address is appended to the header information of the initialization message (step 530).

A lookup of the external router address is then performed by a configuration server to identify branch information (step 540). The branch information/external router address is then used to identify configuration files to be used to configure the computing device (step 550). The configuration files and information may then be sent to the unconfigured computing device (step 560). The unconfigured computing device is then configured using the configuration files and information (step 570). The operation then terminates.

Thus, the present invention provides a mechanism by which identically configured branches of a distributed enterprise may be identified based on their external router addresses. Based on this identification, computing devices deployed in the branches may be configured using branch-specific configuration files and information. As a result, computing devices may be initially configured in a standard manner such that each computing device of the same type has the same initial configuration. Once deployed, the computing devices may be configured for their specific branch location based on the external router address associated with the branch.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for configuring a computing device for use with a specific branch of a distributed enterprise, comprising:

receiving, at a configuration server, an initialization message from the computing device, wherein the initialization message received from the computing device is redirected from a first destination identified in header information of the initialization message to another destination determined by a router associated with the specific branch, wherein the computing device is pre-installed with default configuration information at a central location and wherein the first destination is identified in the configuration information by a dummy address;

extracting, at the configuration server, an external router address from the initialization message, wherein the external router address is associated with the specific branch, wherein the external router address is appended to the initialization message by the router associated with the specific branch in response to receiving the initialization message from the computing device, and wherein the router receives the initialization message from the computing device, extracts a destination identifier from the initialization message, determines that the destination address is the dummy address, recognizes the dummy address as a configuration address, and redirects the initialization message to the configuration server responsive to the destination address being the dummy address;

performing a lookup of the external router address in one of a Dynamic Host Configuration Protocol (DHCP) server, a Lightweight Directory Access Protocol (LDAP) server, or a database server, identifying a corresponding branch identifier;

performing a lookup of the branch identifier in a configuration table identifying branch-specific configuration information for the computing device based on the external router address; and sending the branch-specific configuration information from the configuration server to the computing device to thereby configure the computing device, wherein the computing device self-configures using the configuration information for specialized use in the specific branch.

2. The method of claim 1, wherein the computing device is initially configured, prior to sending the initialization message, in a common manner with other computing devices of a same type that may be deployed in the same or a different branch of the distributed enterprise.

3. The method of claim 1, wherein the computing device is one of a server computing device and a client computing device.

4. A computer program product in a computer recordable medium for configuring a computing device for use with a specific branch of a distributed enterprise, comprising:

instructions for receiving, at a configuration server, an initialization message from the computing device, wherein the initialization message received from the computing device is redirected from a first destination identified in header information of the initialization message to another destination determined by a router associated with the specific branch, wherein the computing device is pre-installed with default configuration information at a central location and wherein the first destination is identified in the configuration information by a dummy address;

instructions for extracting, at the configuration server, an external router address from the initialization message, wherein the external router address is associated with the specific branch, wherein the external router address is appended to the initialization message by the router associated with the specific branch in response to receiving the initialization message from the computing device, and wherein the router receives the initialization message from the computing device, extracts a destination identifier from the initialization message, determines that the destination address is the dummy address, recognizes the dummy address as a configuration address, and redirects the initialization message to the configuration server responsive to the destination address being the dummy address;

instructions for performing a lookup of the external router address in one of a Dynamic Host Configuration Protocol (DHCP) server, a Lightweight Directory Access Protocol (LDAP) server, or a database server, identifying a corresponding branch identifier;

instructions for performing a lookup of the branch identifier in a configuration table identifying branch-specific configuration information for the computing device based on the external router address; and instructions for sending the branch-specific configuration information from the configuration server to the computing device to thereby configure the computing device, wherein the computing device self-configures using the configuration information for specialized use in the specific branch.

5. The computer program product of claim 4, wherein the computing device is initially configured, prior to sending the initialization message, in a common manner with other computing devices of a same type that may be deployed in the same or a different branch of the distributed enterprise.

6. The computer program product of claim 4, wherein the computing device is one of a server computing device and a client computing device.

7. A system for configuring a computing device for use with a specific branch of a distributed enterprise, comprising:

a computing device located in the specific branch of the distributed enterprise, wherein the computing device is pre-installed with default configuration information at a central location and wherein the first destination is identified in the configuration information by a dummy address;

a router associated with the specific branch;

a database server; and a configuration computing device coupled to the router via one or more data networks, wherein the router is configured to:
  receive an initialization message from the computing device;
  append an external router address in response to receiving the initialization message from the computing device;
  extract a destination identifier from the initialization message;
  determine that the destination address is the dummy address;
  recognize the dummy address as a configuration address; and
  redirect the initialization message to the configuration server responsive to the destination address being the dummy address;

wherein the configuration computing device is configured to:
  receive the initialization message from the computing device via the router, wherein the initialization message received from the computing device is redirected from a first destination identified in header information of the initialization message to another destination determined by the router;
  extract the external router address from the initialization message;
  perform a lookup of the external router address in the database server identifying a corresponding branch identifier;
  perform a lookup of the branch identifier in a configuration table identifying branch-specific configuration information for the computing device based on the external router address; and
  send the branch-specific configuration information to the computing device to thereby configure the computing device; and wherein the computing device self-configures using the configuration information for specialized use in the specific branch.

8. The system of claim 7, wherein the computing device is initially configured, prior to sending the initialization message, in a common manner with other computing devices of a same type that may be deployed in the same or a different branch of the distributed enterprise.

9. The system of claim 7, wherein the computing device is one of a server computing device and a client computing device.

* * * * *